United States Patent [19]

Takahashi

[11] Patent Number: 5,692,081
[45] Date of Patent: Nov. 25, 1997

[54] FOUR POLARIZATION MAINTAINING OPTICAL FIBER FERRULE AND OPTICAL COUPLER USING SAME

[75] Inventor: Mitsuo Takahashi, Matsudo, Japan

[73] Assignee: Seikon Giken Co., Ltd., Chiba-ken, Japan

[21] Appl. No.: 594,279

[22] Filed: Jan. 30, 1996

[30] Foreign Application Priority Data

Jan. 31, 1995 [JP] Japan ................ 7-036123

[51] Int. Cl.⁶ .................................................. G02B 6/27
[52] U.S. Cl. ........................................ 385/78; 385/60
[58] Field of Search ................... 385/11, 34, 39, 385/46–47, 51–52, 54, 64, 60–61, 78–80, 82

[56] References Cited

U.S. PATENT DOCUMENTS

| | | | |
|---|---|---|---|
| 4,213,677 | 7/1980 | Sugimoto et al. | 385/61 |
| 4,421,383 | 12/1983 | Carlsen | 385/72 |
| 4,550,975 | 11/1985 | Levinson et al. | 385/78 |
| 4,648,688 | 3/1987 | Ashman et al. | 385/78 |
| 4,880,289 | 11/1989 | Imoto et al. | 385/61 |
| 4,907,853 | 3/1990 | Hiratsuka | 385/78 |
| 4,919,509 | 4/1990 | Miller et al. | 385/72 |
| 4,989,946 | 2/1991 | Williams et al. | 385/78 |
| 5,216,733 | 6/1993 | Nagase et al. | 385/78 |
| 5,276,751 | 1/1994 | Grard et al. | 385/66 |

FOREIGN PATENT DOCUMENTS

| | | | |
|---|---|---|---|
| 59 093417 | 5/1984 | Japan | 385/41 |
| 6-242346 | 9/1994 | Japan | 385/78 |
| 2 218 222 | 11/1989 | United Kingdom | 385/78 |
| 2 239 719 | 7/1991 | United Kingdom | |

OTHER PUBLICATIONS

Fujikura Co., Ltd., (Fujikura Brochure) Catalogue No. 90073000 D, "Linearly Polarized Optical Fiber Coupler" (no date).

*Primary Examiner*—John D. Lee
*Assistant Examiner*—Ellen Eunjoo Kang
*Attorney, Agent, or Firm*—Spencer & Frank

[57] ABSTRACT

A four polarization maintaining optical fiber ferrule is provided which comprises a cylindrical body with a through-hole at the center into which four polarization maintaining optical fiber elements having polarization maintaining planes are fastened, and at least one angular first reference portion on the outer surface of the cylindrical body of the ferrule, wherein the polarization maintaining planes of at least one pair of polarization maintaining optical fiber elements arranged symmetrically with respect to the central axis of the ferrule are fastened at certain angles with respect to the angular first reference portion. An optical coupler is provided which comprises a cylindrical sleeve, a pair of graded index rod lenses within the sleeve which are separated by a thin film for partially transmitting incident light and reflecting the remainder of the light, and the above-referenced four polarization maintaining optical fiber ferrules positioned at each end of the sleeve.

12 Claims, 6 Drawing Sheets

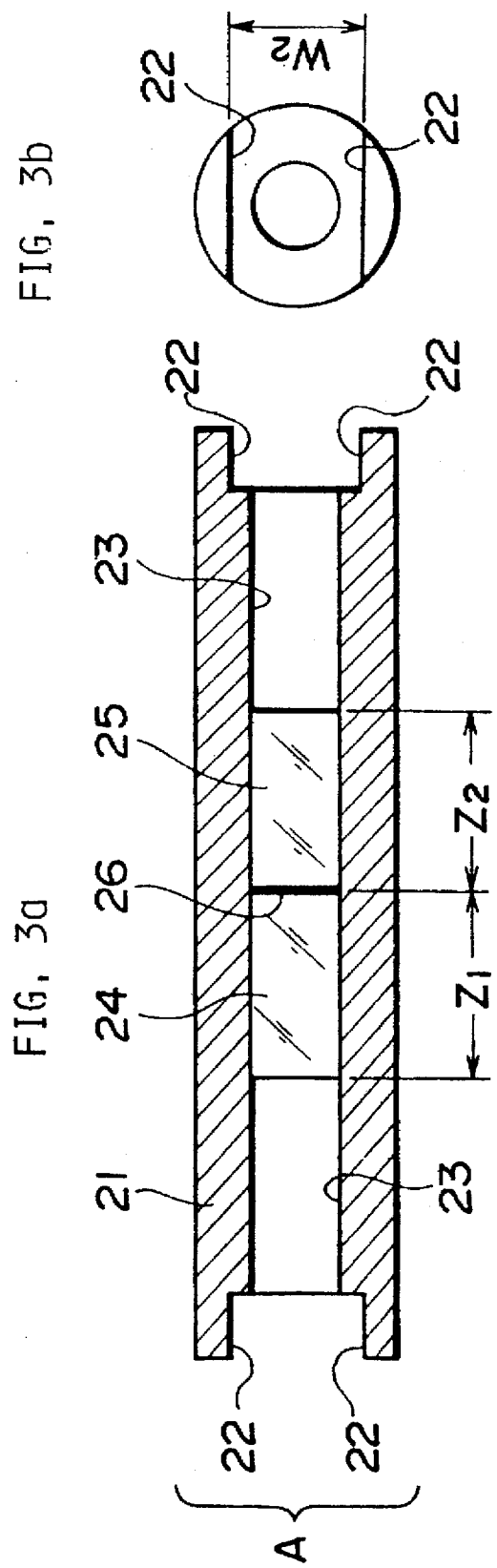

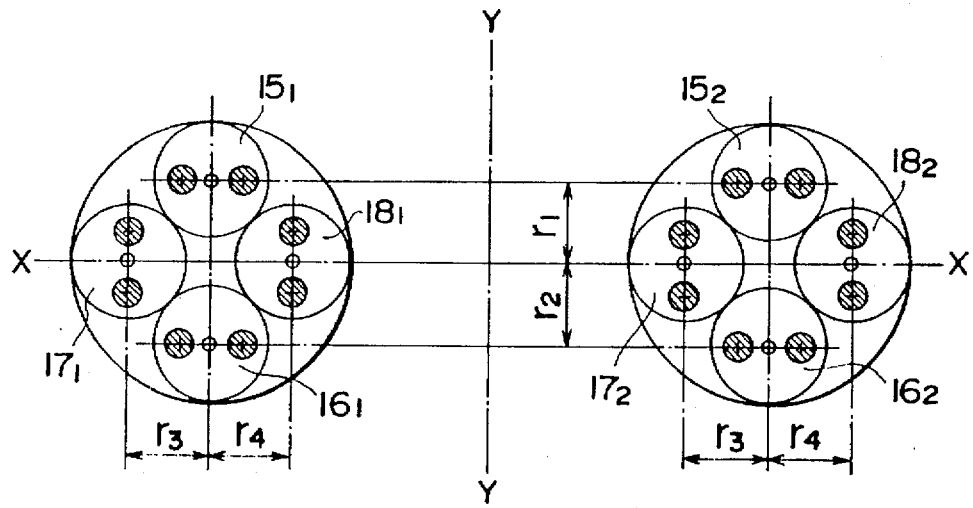
FIG. 5a    FIG. 5b
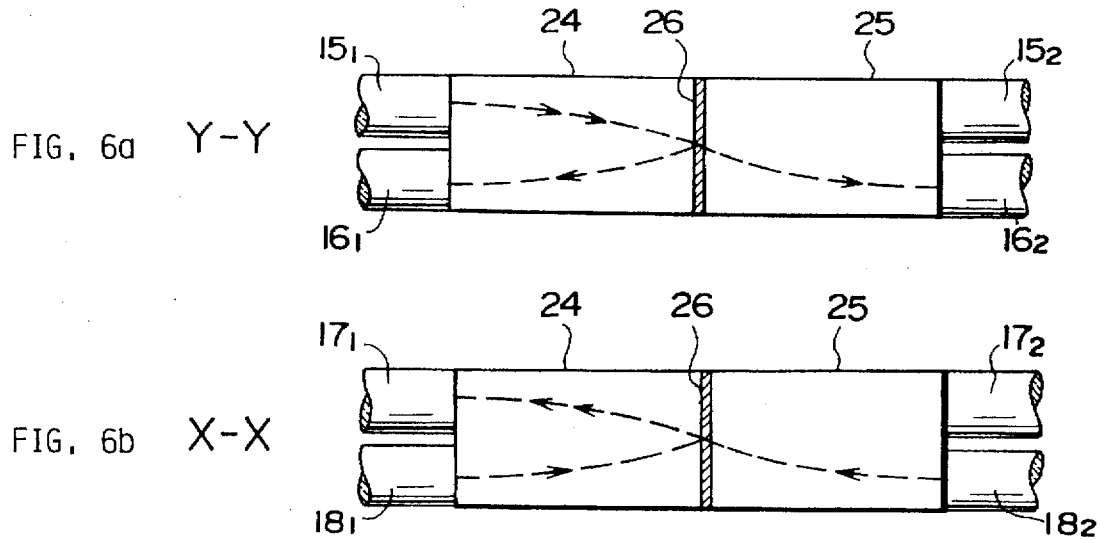
FIG. 6a  Y-Y
FIG. 6b  X-X

FIG.7
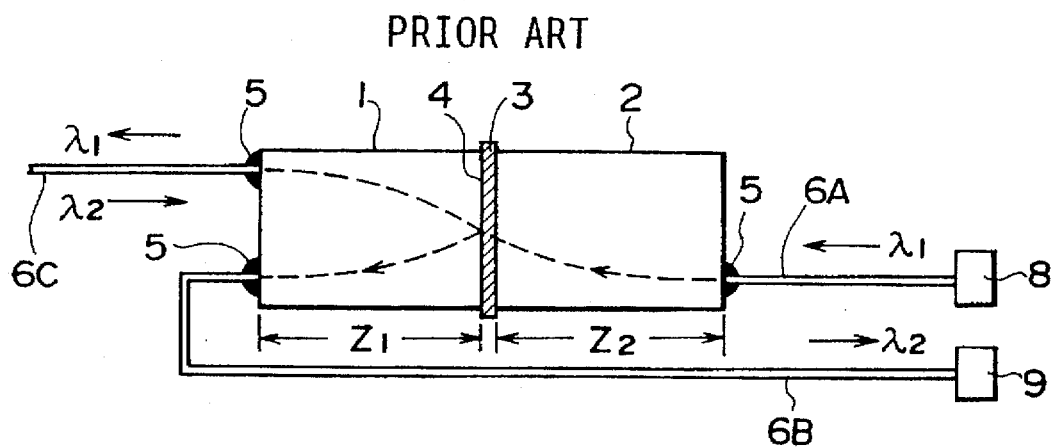
PRIOR ART
FIG.8
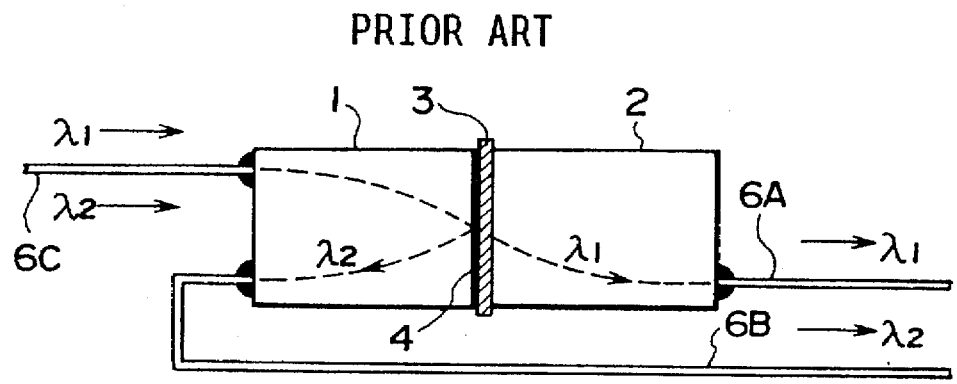
PRIOR ART
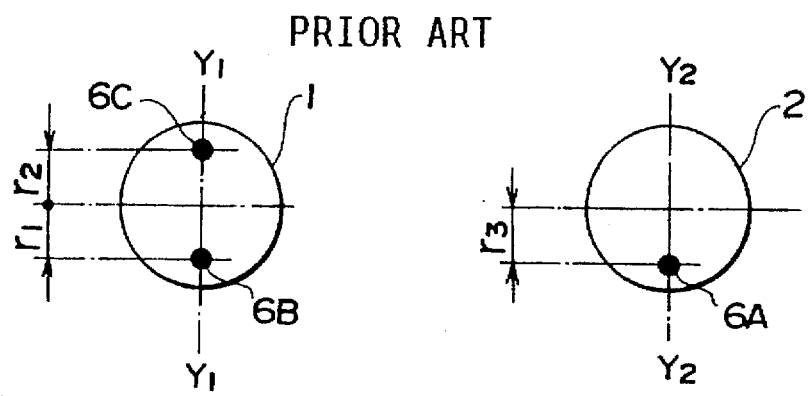
PRIOR ART
FIG. 9a  FIG. 9b

FOUR POLARIZATION MAINTAINING OPTICAL FIBER FERRULE AND OPTICAL COUPLER USING SAME

BACKGROUND OF THE INVENTION

1. Field of the Invention

The present invention relates to a four polarization maintaining optical fiber ferrule and an optical coupler for use with polarization maintaining optical fibers, which has been constructed using a pair of four polarization maintaining optical fiber ferrules, so that the lightwave from a polarization maintaining optical fiber is split between a pair of polarization maintaining optical fibers at an arbitrary splitting ratio or the lightwaves from a pair of polarization maintaining optical fibers are combined into one polarization maintaining optical fiber.

2. Description of the Related Art

The structure of an optical coupler composed of graded index rod lenses, an optical filter having a nonuniform spectral response, and a wavelength division multiplexing means consisting of a reflection plane is known in the prior art and described hereafter.

FIG. 7 shows in principle the structure of the bidirectional optical coupler using the above mentioned optical coupling structure known in the prior art. FIG. 8 shows in principle the structure of the unidirectional optical splitter known in the prior art.

Since the optical coupler commonly used consists of the structures of FIGS. 7 and 8, the optical coupling structure will be described hereafter.

The graded index rod lenses 1 and 2 have the same axial length ($Z_1 = Z_2 = 0.25$ pitch). These graded index rod lenses are available in the market as Selfoc® lenses sold by Nihon Ita Glass Co., Ltd.

Dielectric material layers are deposited on the surface of the glass plate 3 so that the reflection and transmission coefficients have different spectral responses. The glass plate 3 transmits part of the lightwave power at the first wavelength $\lambda_1$ and reflects the other part of the lightwave power at the second wavelength $\lambda_2$.

The optical fibers 6A through 6C are connected to the outer surfaces of the graded index rod lenses 1 and 2 as shown in FIG. 7. The end-faces of the optical fibers 6A through 6C are accurately fastened by the epoxy resin 5 to the graded index rod lenses 1 and 2 on the lines $Y_1$—$Y_1$ and $Y_2$—$Y_2$ passing through the vertical optical axis of each rod lens at the same distance ($r_1 = r_2 = r_3$) from the central optical axis of each rod lens, as shown in FIGS. 9a and 9b.

The lightwave power generated at a first wavelength of $\lambda_1$ from a laser diode light source 8 is incident on the bidirectional optical coupler of FIG. 7. The lightwave power is input to an optical fiber 6A from the light source 8.

In FIG. 7, the end-face of an optical fiber 6B is connected to an optical receiver 9 which consists of a photodiode.

The lightwave power at a second wavelength of $\lambda_2$ is transmitted through an optical fiber 6C from left to right, reflected from the wavelength division multiplexing means 4, and is incident on the optical fiber 6B after passing back through the graded index rod lens 1 from right to left.

The lightwave power at the first wavelength $\lambda_1$, which is fed from the laser diode light source 8 through the graded index rod lens 2, is transmitted to the optical fiber 6C through the wavelength division multiplexing means 4 and then through the graded index rod lens 1 in sequence.

The operation of the unidirectional optical multiplexer/demultiplexer will be described hereafter referring to FIG. 8. As described heretofore, the unidirectional optical coupler of FIG. 8 has the same structure as the bidirectional optical coupler.

The combined lightwave powers at wavelengths of $\lambda_1$ and $\lambda_2$ are incident on the graded index rod lens 1 after passing through the optical fiber 6C. The second lightwave power at a wavelength of $\lambda_2$ is reflected from the wavelength division multiplexing means 4. The first lightwave power at a wavelength of $\lambda_1$ is incident on the graded index rod lens 2 after passing through the wavelength division multiplexing means 4 and then goes to the optical fiber 6A. The second lightwave power at a wavelength of $\lambda_2$, which is reflected from the wavelength division multiplexing means 4, passes back through the graded index rod lens 1 to the optical fiber 6B. This process is also reversible. If the lightwave power at a wavelength of $\lambda_1$ is fed through the optical fiber 6A when the lightwave power at a wavelength of $\lambda_2$ is fed through the optical fiber 6B, the combined lightwave powers at wavelengths of $\lambda_1$ and $\lambda_2$ can be obtained from the optical fiber 6C.

There is a well known optical coupler fabricated by fusing and drawing a pair of attached optical fiber portions, which differs from that fabricated using a pair of graded index rod lenses. For instance, an optical coupler of the fusion and drawn type is disclosed in the United Kingdom patent application number GB2239719A. An optical coupler fabricated based on the evanescent effect is produced and sold by Fujikura Co., Ltd. (See Polarization Maintaining Optical Fiber Series No. 90073000D.)

The optical coupler of the fusion and drawn type has an isolation of 15 dB between a pair of wavelengths. An optical coupler of the graded index rod lens type has an isolation of 40 dB or more.

The optical coupler of the graded index rod lens type has a certain optical power splitting ratio which is independent of the light power wavelength. However, the optical coupler of the fusion and drawn type has a wavelength dependent optical power splitting ratio.

The optical coupler of the graded index rod lens type has the defect that any alignment errors between the optical fibers 6B or 6C and the rod lens 1 and between the optical fiber 6A and the rod lens 2 cause large insertion losses when the optical fibers 6A through 6C are connected to the graded rod lenses 1 and 2. As shown in FIGS. 9A and 9B, the optical fibers 6A, 6B, and 6C are arranged at $r_1$, $r_2$ and $r_3$ distances from the central optical axes of the graded index rod lenses 1 and 2, respectively. Distances $r_1$, $r_2$ and $r_3$ are aligned at the specified values plus (or minus) 1 to 2 μm or less. Each of the optical fibers 6A, 6B and 6C is fastened to the respective rod lens 1 or 2 at specified points determined by lines $Y_1$—$Y_1$ and $Y_2$—$Y_2$ which pass through the central optical axis of the rod lenses 1 and 2, as shown in FIGS. 9a and 9b. If errors occur when the optical fibers 6A through 6C are fastened to the rod lenses 1 and 2, excessive optical power losses are generated in proportion to these errors.

The optical fibers 6A through 6C are fastened to the graded index rod lenses 1 and 2 by the epoxy resin 5 so that no error may occur.

Since fabrication of the prior art coupler requires a number of processes, a high degree of skill, and great expense, the price of the product is necessarily high. If a laser power source having a large optical power capability is used with the optical coupler, the epoxy resin will be fatigued by the laser power from operation over a long period of time.

Other problems of fabricating the optical coupler for use with polarization maintaining optical fibers are expected to arise from the use of graded index rod lenses of the aforementioned structure. These are as follows.

FIG. 10 shows the structure of an optical coupler wherein the polarization maintaining optical fibers 60A, 60B and 60C are used in place of the optical fibers 6A, 6B and 6C, respectively.

As described heretofore and illustrated in FIGS. 9a and 9b, each of the optical fibers 6A, 6B and 6C is to be fastened to the respective rod lens 1 or 2 at a specified point so that the optical fiber 6A, 6B or 6C is located at the point determined by lines $Y_1$—$Y_1$ or $Y_2$—$Y_2$ which pass through the central optical axis of the rod lenses 1 and 2.

The polarization maintaining optical fiber has a cross-sectional structure which is different from the normal optical fiber in that tension members 67 are symmetrically provided on both sides of the core 65 within the cladding layer 66 surrounding the core 65.

If any angular phase errors have occurred in an interface between the axes $Y_1$—$Y_1$ and $Y_2$—$Y_2$ and among the axes $X_1$—$X_1$, $X_2$—$X_2$, and $X_3$—$X_3$ when a pair of polarization maintaining optical fibers are connected together, the extinction ratio will be decreased since the polarization of the polarization maintaining optical fibers is lost.

The extinction ratio ER can be calculated by $$ER(dB) = -10 \log(\tan^2 \theta)$$

where θ: Angular phase errors (degrees) in the Y—Y and X—X directions.

An extinction ratio of 30 dB or more seems to be desired. For ER=30 dB, $\theta \leq 1.8°$ is obtained.

If the ratio of the reflectance to the transmittance of the wavelength division multiplexing means 4 is specified as 50 to 50, the lightwave power which has passed through the polarization maintaining optical fiber 60C comes out to the polarization maintaining optical fibers 60A and 60B so that the optical power ratio of the polarization maintaining optical fiber 60A to the polarization maintaining optical fiber 60B is 50 to 50.

If the ratio of the reflectance to the transmittance of the wavelength division multiplexing means 4 is specified as 10 to 90, the optical power ratio of the polarization maintaining optical fiber 60A to the polarization maintaining optical fiber 60B is 10 to 90.

When lightwave powers are concurrently input into the polarization maintaining optical fibers 60A and 60B, the lightwave powers are combined together and come out through the polarization maintaining optical fiber 60C. This is the principle of operation of the optical multiplexer/demultiplexer consisting of a 1×2 circuit.

A mirror consisting of an optical film which reflects the lightwave power at a wavelength of $\lambda_1$ and transmits the lightwave power at a wavelength of $\lambda_2$ has a capability to operate as an optical coupler consisting of a 1×2 circuit.

The optical coupler for use with polarization maintaining optical fibers has a crosstalk of 40 dB or more which can easily be obtained, while the optical coupler for use with normal optical fibers has a crosstalk of 15 dB. Excessive optical losses are caused by the mechanical inaccuracy of the assembly and are dependent on the alignment of the polarization maintaining optical fibers 60A, 60B and 60C to the graded index rod lenses 1 and 2 when they are connected together.

The polarization maintaining optical fibers 60A, 60B and 60C are, as shown in FIG. 10, to be arranged at $r_1$, $r_2$ and $r_3$ distances from the central optical axes 0—0 of the graded index rod lenses 1 and 2, respectively. Distances $r_1$, $r_2$ and $r_3$ are to be aligned at specified values plus (or minus) 2 μm or less. Angular phase errors among the axes $X_1$—$X_1$, $X_2$—$X_2$ and $X_3$—$X_3$, along which tension is applied to the polarization maintaining optical fibers to keep the extinction ratio high, are to be 1.8° or less. This is accomplished by accurately aligning the polarization maintaining optical fibers to the graded index rod lenses. Since the fabrication of the prior art coupler requires a number of processes, a high degree of skill, and great expense, the price of the product is necessarily high.

Since epoxy resin is used to connect the polarization maintaining optical fibers to the graded index rod lenses, the epoxy resin will become fatigued through exposure to the high powered laser beams which are transmitted through the interfaces between the polarization maintaining optical fibers and graded index rod lenses for a long period of time during the operation of the coupler.

U.S. Pat. No. 4,989,946 discloses optical fiber switches constructed using ferrules whose appearances resemble those of the present invention. The differences will be described hereafter together with the present invention.

The first object of the present invention is to provide a four polarization maintaining optical fiber ferrule, wherein the polarization maintaining planes can be set in place with respect to the ferrule.

The second object of the present invention is to provide an optical coupler which stably exhibits satisfactory performance using the four polarization maintaining optical fiber ferrule, which can be fabricated at low cost.

SUMMARY OF THE INVENTION

In order to accomplish the object of the present invention, a four polarization maintaining optical fiber ferrule is fabricated in accordance with the present invention wherein four polarization maintaining optical fiber elements (i.e., polarization maintaining optical fibers without overcoats) are inserted into a central throughhole at the end-face of the ferrule and fastened there, and wherein the relation between the diameter of the central throughhole at the end-face thereof and the diameter of these polarization maintaining optical fiber elements is defined by the following formula:

$$d = (2^{1/2}+1)d_1 + \delta$$

where d: Diameter of the central throughhole at the end-face of the ferrule.

$d_1$: Diameter of the polarization maintaining optical fiber elements (i.e., unclad polarization maintaining optical fibers).

δ: Allowance for error in μm.

An angular first reference portion is provided on the outer cylindrical surface of the ferrule. The polarization maintaining plane of at least one polarization maintaining optical fiber element within the ferrule is kept at a certain angle with respect to the first reference portion and fastened there.

In the four polarization maintaining optical fiber ferrule, the nominal value of the diameter (d) of the central throughhole of the ferrule is given by d=303 μm, the nominal value of the diameter ($d_1$) of the polarization maintaining optical fiber element is given by $d_1$=125 μm, and the allowance (δ) is given by δ<3 μm.

In the four polarization maintaining optical fiber ferrule, the polarization maintaining planes of at least one pair of polarization maintaining optical fiber elements arranged symmetrically with respect to the central axis of the ferrule are kept at certain angles with respect to the first reference portion of the ferrule, and fastened there.

In the four polarization maintaining optical fiber ferrule, the polarization maintaining planes of each pair of polarization maintaining optical fiber elements arranged symmetrically with respect to the central axis of the ferrule are kept at certain angles with respect to the first reference portion of the ferrule, and fastened there.

In order to accomplish the object of the present invention, an optical coupler using a pair of four polarization maintaining optical fiber ferrules is built which consists of a sleeve, a thin film which transmits part of an incident light while reflecting the remainder, a lens unit consisting of a pair of graded index rod lenses arranged within the sleeve so that the thin film is inserted between the pair of graded index rod lenses, and a pair of four polarization maintaining optical fiber ferrules which have been described heretofore, wherein the pair of ferrules are inserted into the sleeve from both ends thereof.

In the optical coupler using a pair of four polarization maintaining optical fiber ferrules, second reference portions are provided in the sleeve so as to mate with the first reference portions of the above ferrules.

In the optical coupler using a pair of four polarization maintaining optical fiber ferrules, the first reference portions of the ferrules are outer flat planes, and the second reference portions of the sleeve are inner flat planes which can mate with the outer flat planes.

In the optical coupler using a pair of four polarization maintaining optical fiber ferrules, the optical coupler(s) is(are) an optical coupler of 1×2 circuit type or a set of optical couplers of 1×2 circuit type.

In the optical coupler having a pair of four polarization maintaining optical fiber ferrules, the thin film transmits the first wavelength component ($\lambda_1$) contained in the incident light and reflects the second wavelength component ($\lambda_2$) contained therein.

In the optical coupler using a pair of four polarization maintaining optical fiber ferrules, the thin film which transmit part of the incident light while reflecting the remainder can be a multilayer dielectric film formed on a surface of the graded index rod lens.

BRIEF DESCRIPTION OF THE DRAWINGS

FIGS. 3a and 3b show a cross-sectional view of an embodiment of a lens unit for the optical coupler built in accordance with the present invention.

FIGS. 5a and 5b show an extended view of an end-face illustrated to explain the use of the optical coupler of FIG. 4 as a pair of 1×2 optical couplers.

FIGS. 6a and 6b show a cross-sectional view of a graded index rod lens and a thin film, which is illustrated to explain the use of the optical coupler of FIG. 4 as a pair of 1×2 optical couplers.

FIG. 7 shows in principle a cross-sectional view of a conventional structure of a bidirectional optical coupler wherein a graded index rod lens, a filter having a nonuniform spectral response, and a reflection surface are combined together.

FIG. 8 shows in principle a cross-sectional view of a conventional structure of a unidirectional optical coupler wherein a graded index rod lens, a filter having a nonuniform spectral response, and a reflection surface are combined together.

FIGS. 9a and 9b show cross-sectional views of the junctions between the graded index rod lenses and the optical fibers of both devices of FIGS. 7 and 8, respectively.

DETAILED DESCRIPTION OF THE PREFERRED EMBODIMENTS

Figure 1:
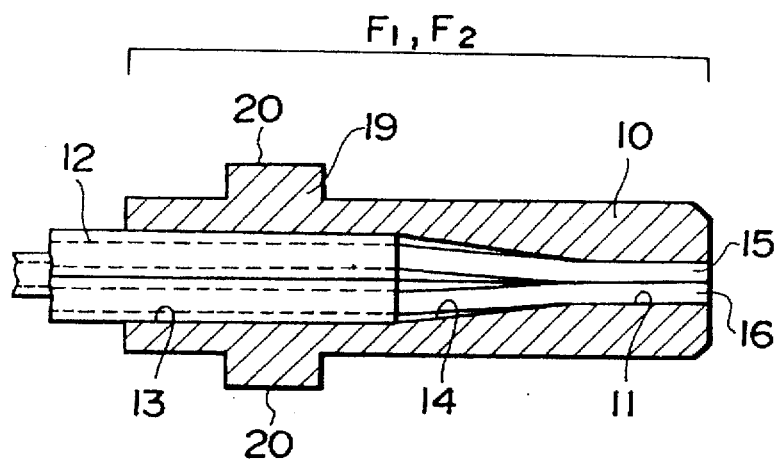
FIG. 1 shows a cross-sectional view of an embodiment of a four polarization maintaining optical fiber ferrule, which is built in accordance with the present invention.

The present invention will be described hereafter referring to the drawings.

Figure 2A:
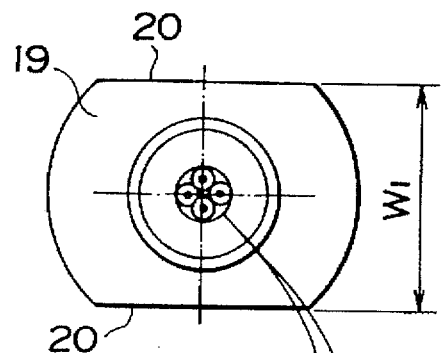
FIGS. 2a and 2b show an end-face of the embodiment of the ferrule of FIG. 1 wherein the central portion thereof is partly extended.
Figure 2B:
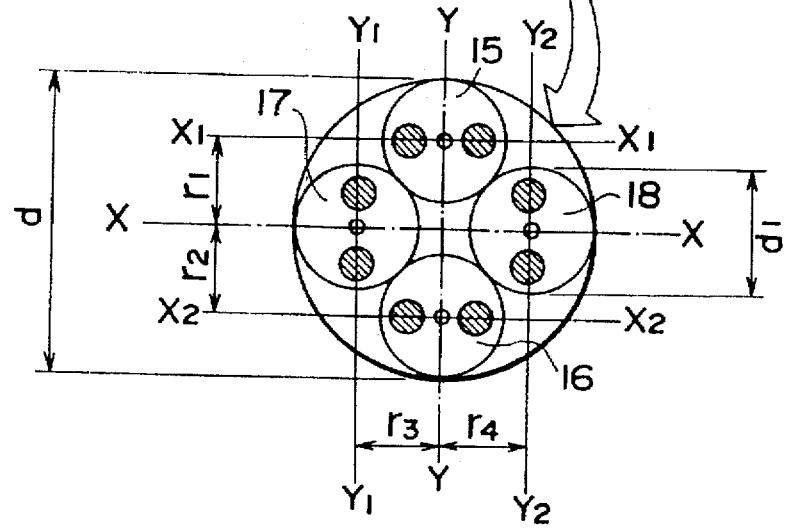

FIG. 1 shows a cross-sectional view of an embodiment of a four polarization maintaining optical fiber ferrule, which is built in accordance with the present invention. FIGS. 2a and 2b show an end-face of the embodiment of the ferrule wherein the central portion thereof is partly extended.

Ferrule 10 is a cylinder made of a sintered zirconia ceramic material. Ferrule 10 has a throughhole 11 at the center of its right side in FIG. 1 with an inner diameter d=303 μm at the end-face thereof. The throughhole 11, having a moderate length, can accept four polarization maintaining optical fiber elements 15, 16, 17 and 18. A hole 13 is provided on the left side of ferrule 10 in FIG. 1 to accept four polarization maintaining optical fibers with overcoats 12. The throughhole 11 is connected to the hole 13 through a connecting hole 14 having a tapered surface with an inclination angle of 15 degrees or less.

A flange 19 is provided on the left side of the outer surface of ferrule 10 in FIG. 1. A first reference portion 20 consists of a flat plane on flange 19 having a width $W_1$ when measured along a line perpendicular to the central axis through the center of ferrule 10 as shown in FIGS. 1 and 2a.

The polarization maintaining optical fiber elements 15, 16, 17 and 18 represent the end-faces of the polarization maintaining optical fibers from which the overcoats 12 have been removed. Each polarization maintaining optical fiber element 15, 16, 17 and 18 has an outer diameter $d_1$ of 125 μm ($d_1$=125 μm).

The diameter d of the throughhole 11, which can be seen from the end-face of ferrule 10, is expressed in terms of the diameter $d_1$ of the polarization maintaining optical fiber elements 15, 16, 17 and 18 as:

$$d=(2^{1/2}+1)d_1+\delta$$

where

δ: Allowance for errors on the order of microns.

The allowance δ is 3 μm or less (δ≦3 μm) in the present embodiment. If the inner diameter d of the throughhole 11 at the end-face of the ferrule 10 is set at 303 μm (d=303 μm), the outer surfaces of the polarization maintaining optical fiber elements 15, 16, 17 and 18 are in tight contact. When the polarization maintaining optical fiber elements 15, 16, 17 and 18 are inserted into the throughhole 11, the outer surfaces of the polarization maintaining optical fiber elements 15, 16, 17 and 18 can be in contact with the inner surface of the throughhole 11.

At this step, the following operations are required. The ferrule 10 is to be installed in a positioning tool. The first reference portion 20 consisting of a flat plane on the outer surface of ferrule 10, which is located on the flange 19 in parallel with the central axis of ferrule 10, is to be set on the base line along the X—X axis of a microscope (not shown). The end-faces of four polarization maintaining optical fiber elements 15, 16, 17 and 18 are to be monitored on the microscope with a multiplication factor of 400 to 500. The polarization maintaining optical fiber elements 15, 16, 17 and 18 are to be revolved until the $X_1$—$X_1$ and $X_2$—$X_2$ axes along which the tensile forces are applied to the polarization maintaining optical fiber elements 15 and 16 accurately agree with the base line on the X—X axis of the microscope.

The polarization maintaining optical fiber elements 15, 16, 17 and 18 are to be revolved in the same manner as above until the $Y_1$—$Y_1$ and $Y_2$—$Y_2$ axes along which the tensile forces are applied to the polarization maintaining optical fiber elements 17 and 18 accurately agree with the base line on the Y—Y axis of the microscope. Thereafter, the end-faces of the polarization maintaining optical fiber elements 15, 16, 17 and 18 are to be polished and the end-faces of the polarization maintaining optical fibers with their overcoats 12 are connected to other fibers by an adhesive agent at the open end of hole 13. A pair of four polarization maintaining optical fiber ferrules F1 and F2, which are used to construct an optical coupler for polarization maintaining optical fibers, can be built in this manner.

Assuming that the inner diameter d of the throughhole 11 at the end-face of ferrule 10 is 303 µm (d=303 µm) and that the outer diameter $d_1$ of the respective polarization maintaining optical fiber elements 15, 16, 17 and 18 is 125 µm ($d_1$=125 µm), then the distances $r_1$, $r_2$, $r_3$ and $r_4$ from the central axes of the ferrule throughhole 11 to the polarization maintaining optical fiber elements 15, 16, 17 and 18, as set forth in FIG. 2b, are calculated to be 88.39 to 89.00 µm. The calculation of distance of the optical axis of each polarization maintaining optical fiber element 15, 16, 17 and 18 from the central axis of the throughhole 11 has an error 0.3 µm, which can be disregarded. The angle of the optical axis of a polarization maintaining optical fiber element 15, 16, 17 or 18 from the optical axis of another polarization maintaining optical fiber element 15, 16, 17, or 18 has an error of 0.004°, which causes no problem when the ferrule is put into practical use.

Consider a lens unit assembly A consisting of a pair of four polarization maintaining optical fiber ferrules F1 and F2 which are coupled together to construct an optical coupler.

FIG. 3a shows a cross-sectional view of an embodiment of a lens unit. FIG. 3b shows a cross-sectional view of an end-face of the lens unit wherein a ferrule F1 or F2 is inserted.

Figure 4:
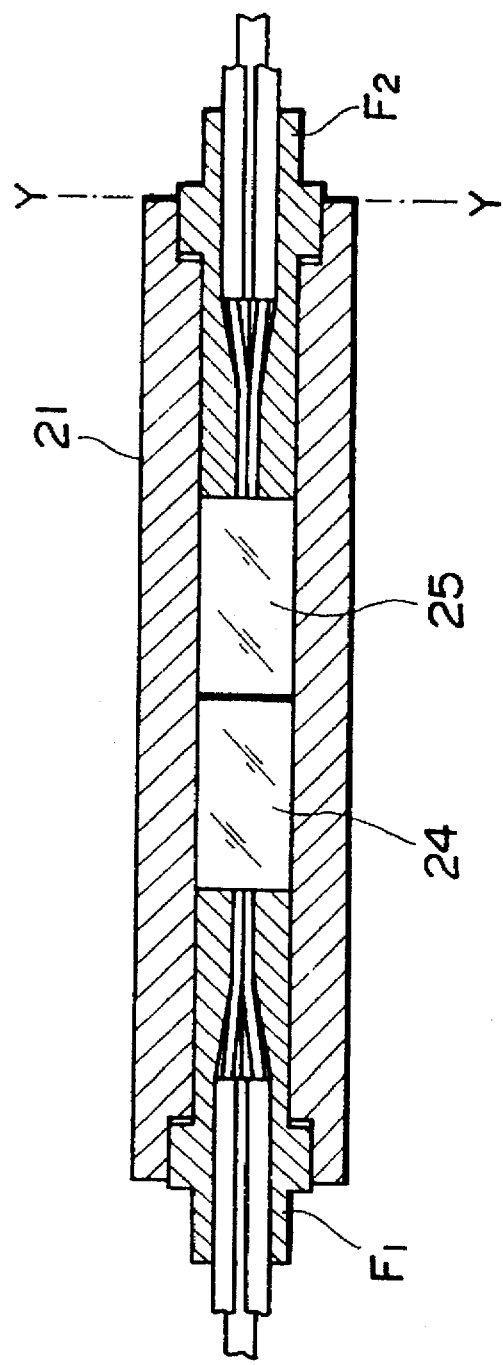
FIG. 4 shows a cross-sectional view of an embodiment of an optical coupler constructed using the lens unit of FIGS. 3a and 3b combined with a pair of ferrules of FIG. 1.
Figure 10:
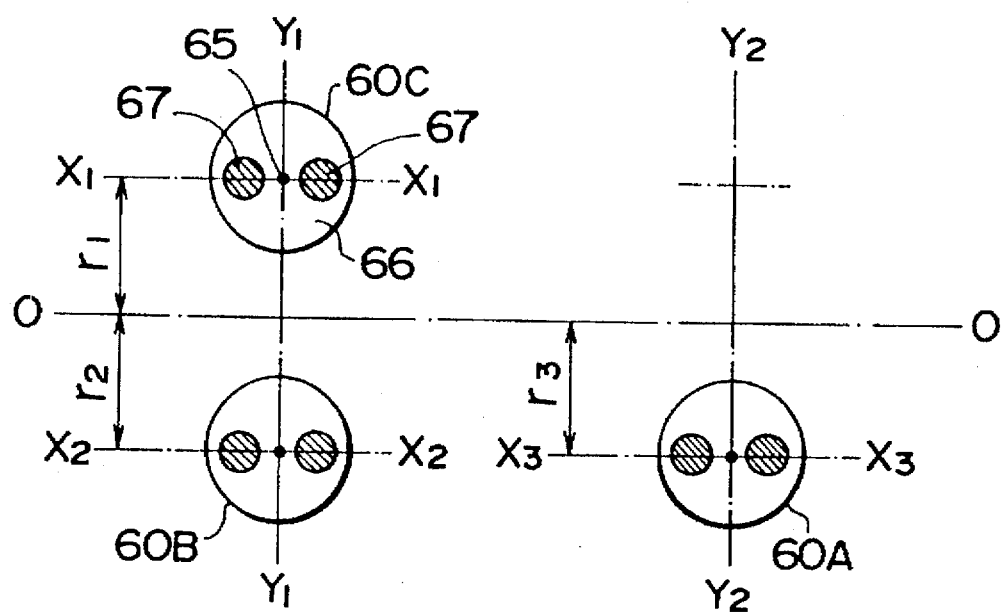
FIG. 10 shows cross-sectional views of polarization maintaining optical fibers, wherein the polarization maintaining optical fibers are used in place of normal optical fibers in the optical couplers of FIGS. 7 and 8.

FIG. 4 shows a cross-sectional view of an embodiment of an optical coupler constructed using the lens unit of FIGS. 3a and 3b combined with the ferrules F1 and F2.

A precise throughhole 23 is bored through a cylindrical sleeve 21 of the lens unit assembly as shown in FIG. 3a.

A pair of second reference portions consist of flat planes 22 on the inner surface of the cylindrical sleeve 21 forming a pair of parallel grooves having width $W_2$ at both ends of the cylindrical sleeve 21 as shown in FIGS. 3a and 3b. A pair of first reference portions consist of flat planes 20 on the outer surface of ferrules F1 and F2. A pair of second reference portions 22 at both ends of the cylindrical sleeve 21 mates with a pair of first reference portions 20 on ferrules F1 and F2 with a gap of 20 µm or less.

As shown in FIG. 3a, a pair of graded index rod lenses 24 and 25 is inserted into throughhole 23 bored at the center of the cylindrical sleeve 21 toward the central portion of the cylindrical sleeve 21. A thin film 26 which transmits part of the incident light and reflects the remainder is formed between the pair of graded index rod lenses 24 and 25 so that the lens unit assembly A of FIG. 3a is built using these components.

FIG. 4 shows a cross-sectional longitudinal view of an embodiment of an optical coupler constructed using a pair of four polarization maintaining optical fiber ferrules F1 and F2, which is built in accordance with the present invention.

The optical coupler of FIG. 4 is built by inserting a pair of four polarization maintaining optical fiber ferrules F1 and F2 into the throughhole 23 of the lens unit assembly A so that the first reference portions 20 consisting of flat planes mate with the second reference portions 22 consisting of flat planes on both sides of the lens unit assembly A, and that the end-faces of ferrules F1 and F2 contact the outer end-face of each graded index rod lenses 24 and 25.

Assume that the first reference portions 20 consisting of flat planes on the four polarization maintaining optical fiber ferrules F1 and F2 mate with the second reference portions 22 consisting of flat planes at both end-faces of the cylindrical sleeve 21 of assembly A when the optical coupler is constructed using a pair of four polarization maintaining optical fiber ferrules F1 and F2 in accordance with the present invention. The locations of the respective polarization maintaining optical fibers in the direction of the radius in each ferrule, the angular phases among these fibers along the circumference of each ferrule, and the angular phases among the axes to which the tensile forces are applied can accurately be determined without any adjustment during the assembling of the optical coupler.

The operation of the optical coupler built in accordance with the present invention will be described hereafter referring to FIGS. 5a, 5b, 6a and 6b.

FIGS. 5a and 5b show an extended view of the end-faces of a pair of four polarization maintaining optical fiber ferrules F1 and F2 seen from the graded index rod lenses 24 and 25.

As seen from FIG. 5a, polarization maintaining optical fibers $15_1$, $16_1$, $17_1$, and $18_1$ are installed in the four polarization maintaining optical fiber ferrule F1. As seen from FIG. 5b, polarization maintaining optical fibers $15_2$, $16_2$, $17_2$, and $18_2$ are installed in the four polarization maintaining optical fiber ferrule F2.

FIGS. 6a and 6b show a cross-sectional view of the optical coupler. The optical coupler is longitudinally cut along the Y—Y axis of FIG. 2b in FIG. 6a, and along the X—X axis of FIG. 2b in FIG. 6b. If the ratio of the reflection coefficient to the transmittance for the thin film 26 is 50 to 50, 50% of the light power incident from the polarization maintaining optical fiber $15_1$ is reflected from the thin film 26, and then goes to the polarization maintaining optical fiber $16_1$.

The remaining 50% of the incident light power is transmitted through the thin film 26, and goes to the polarization maintaining optical fiber $16_2$. The optical coupler is thus operated as a 1×2 optical coupler having a light power splitting ratio of 50 to 50.

If the polarization maintaining optical fibers $18_1$ and $18_2$ are connected to the light sources in FIG. 6b, the polarization maintaining optical fibers $17_1$, $18_2$, and $18_2$ can be used for the 1×2 optical coupler.

The light power coming from the polarization maintaining optical fiber $18_1$, goes out through the polarization maintaining optical fiber $17_1$, reflected from the thin film 26, because the polarization maintaining optical fiber $17_1$ is symmetrical with respect to the polarization maintaining optical fiber $18_1$. The light power coming from the polarization maintaining optical fiber $18_2$ goes out through the polarization maintaining optical fiber $17_1$, after being transmitted through the thin film 26, because the polarization maintaining optical fiber $17_1$ is symmetrical with respect to the polarization maintaining optical fiber $18_2$. This is the reason that the above circuit operates as a 1×2 optical coupler.

This embodiment of the optical coupler functions as a pair of optical couplers of 1×2 circuit. The polarization maintaining optical fibers $15_2$ and $17_2$ are used as dummy fibers for the alignment.

Assume that the thin film 26 transmits the first wavelength $(\lambda_1)$ component of the incident light while reflecting the second wavelength $(\lambda_2)$ component.

If the first wavelength $(\lambda_1)$ component is fed to the optical fiber $18_2$ when the second wavelength $(\lambda_2)$ component is fed to the optical fiber $18_1$, both the first and second wavelength $(\lambda_1+\lambda_2)$ components appear at the optical fiber $17_1$, since the first wavelength $(\lambda_1)$ component is combined with the second wavelength $(\lambda_2)$ component on the optical fiber $17_1$.

As described heretofore, up to two optical couplers can be obtained using a pair of ferrules with 4 optical fibers and a lens unit.

The embodiment of FIGS. 5a, 5b, 6a, and 6b uses two optical fibers installed in ferrule F2, although ferrules F1 and F2, each containing four optical fibers, are used to build an optical coupler. An optical coupler can also be built using two optical fibers installed in ferrule F2 and one optical fiber installed in ferrule F1.

The installation of four optical fibers into a throughhole of a ferrule in the present invention is necessary.

Unused optical fibers are necessary to mechanically maintain the locations of the optical fibers being used. The end-faces of the unused optical fibers are to be made opaque, if necessary.

U.S. Pat. No. 4,989,946 discloses a ferrule whose throughhole contains both two optical fiber end-faces and seven optical fiber end-faces. The diameter of the throughhole of the ferrule wherein two optical fiber end-faces have been inserted is twice that of the optical fiber.

Assume that the inner diameter of the ferrule is dw, the diameter of the optical fiber is $d_1$, and that the error between the diameter of the throughhole of the ferrule and the diameter of the optical fiber is δw. Then $dw=2d_1+\delta w$ holds for them. If δw=3 μm, the angular phase error between the pair of optical fibers is 12.5 degrees for a ferrule, and 25 degrees for a pair of ferrules. These ferrules can not be used in the present invention.

An angular phase error of 0.004 degree exists in the embodiments of the present invention.

The equation $dw=3d_1+\delta w$ is valid for the ferrule containing 7 optical fibers. The fabrication of the ferrule containing 7 optical fibers is difficult because 7 optical fibers can not easily be aligned.

As described heretofore, the optical coupler built in accordance with the present invention using a pair of four polarization maintaining optical fiber ferrules is fabricated using a pair of optical couplers of the 1×2 circuit type which are built in a lens assembly A constructed using a pair of graded index rod lenses. Because of this simple construction, the optical coupler is small and light weight. The optical coupler can be built in the same manner as a conventional optical coupler, and no special skill is needed for fabricating the assembly.

The accuracy of aligning the optical axes between the respective polarization maintaining optical fibers and graded index rod lenses is specified as 2 μm or less in the angular phase in the circular and radial directions. Excessive optical power loss can thus be reduced.

In addition, the axes of the polarization maintaining optical fibers installed in the ferrules, to which the tensile forces have been applied, can be aligned with respect to the reference plane of the ferrules before the optical coupler is assembled. The sleeve combined with the lens assembly can be aligned using the reference planes without additional adjustment. The extinction ratio can thus be kept high.

This invention can drastically reduce the performance degradation of the optical coupler due to the fatigue of the adhesive agent, because it is not used on the surfaces of the optical fibers through which the lightwave is transmitted, even if a light power source having high output power is used.

Since a pair of optical couplers of the 1×2 circuit type are built in a structure in accordance with the present invention, optical fiber gyros (i.e., optical fiber rotation sensors) or Mach-Zender interferometer sensors (i.e., optical fiber acoustic, electromagnetic field, and pressure sensors) can be built in small sizes.

What are claimed are:

1. A four polarization maintaining optical fiber ferrule, comprising:

(a) a cylindrical body having an outer surface, a central axis, an end-face perpendicular to the central axis, and a throughhole at the center of the end-face extending along the central axis, said throughhole having a diameter at the end-face;

(b) at least one angular first reference portion on the outer surface of said cylindrical body;

(c) four polarization maintaining optical fiber elements fastened within said throughhole, each of the polarization maintaining optical fiber elements having a polarization maintaining plane and a diameter which is related to the diameter of said throughhole by the following formula:

$$d=(2^{1/2}+1)d_1+\delta$$

where d: Diameter of the throughhole at the center of the end-face of said ferrule, $d_1$: Diameter of the polarization maintaining optical fiber element, and δ: Allowance for error in μm; and (d) wherein the polarization maintaining planes of at least one pair of polarization maintaining optical fiber elements arranged symmetrically with respect to said central axis are fastened at certain angles with respect to said angular first reference portion.

2. A four polarization maintaining optical fiber ferrule as claimed in claim 1, wherein the polarization maintaining planes of each pair of polarization maintaining optical fiber elements arranged symmetrically with respect to the central axis of said four polarization maintaining optical fiber ferrule are fastened at certain angles with respect to said angular first reference portion.

3. A four polarization maintaining optical fiber ferrule as claimed in claim 1, wherein the diameter of the throughhole of said four polarization maintaining optical fiber ferrule is substantially 303 μm, the diameters of the polarization maintaining optical fiber elements are substantially 125 μm, and the allowance for error is 3 μm or less.

4. A four polarization maintaining optical fiber ferrule as claimed in claim 1, wherein said throughhole consists of a first portion terminating at the end-face, a second portion having an opening larger than the first portion to accommodate optical fiber overcoats, and a third portion having a tapered surface with an angle of inclination of 15 degrees or less connecting the first and second portions.

5. A four polarization maintaining optical fiber ferrule as claimed in claim 1, wherein the angle between the optical axis of a first polarization maintaining optical fiber element and the optical axis of a second polarization maintaining optical fiber element has an error of substantially 0.004 degree.

6. An optical coupler, comprising:
 (a) a cylindrical sleeve having an inside surface and first and second ends;
 (b) a pair of four polarization maintaining optical fiber ferrules, one of said ferrules positioned at each of the first and second ends of said sleeve, and each of said ferrules having a cylindrical body with an outer surface, a central axis, an end-face perpendicular to the central axis, a throughhole at the center of the end-face extending along the central axis, said throughhole having a diameter at the end-face, at least one first reference portion on the outer surface of the cylindrical body of the ferrule, and four polarization maintaining optical fiber elements fastened within said throughhole, each of the polarization maintaining optical fiber elements having a polarization maintaining plane and a diameter which is related to the diameter of said throughhole by the following formula:

$$d=(2^{1/2}+1)d_1+\delta$$

where
 d: Diameter of the throughhole at the center of the end-face of said ferrule,
 $d_1$: Diameter of the polarization maintaining optical fiber element,
and
 $\delta$: Allowance for error in μm; and
wherein the polarization maintaining planes of at least one pair of polarization maintaining optical fiber elements arranged symmetrically with respect to the central axis of said ferrule are fastened at certain angles with respect to said first reference portion;
 (c) a lens unit positioned within said sleeve, comprising first and second graded index rod lenses, each of said graded index rod lenses having a first end facing the first end of the other graded index rod lens and a second end adjacent to the end-face of one of said ferrules; and
 (d) a thin film located between the first ends of said first and second graded index rod lenses within said sleeve which partially transmits incident light and reflects the remainder of the light.

7. An optical coupler as claimed in claim 6, further comprising second reference portions located on the inside surface of said sleeve at the first and second ends of said sleeve to mate with the first reference portions of said ferrules.

8. An optical coupler as claimed in claim 7, wherein said first reference portions of said ferrules comprise first flat planes on the outer surface of the cylindrical body of said ferrule and said second reference portions of said sleeve comprise second flat planes on the inner surface of said sleeve, wherein said first and second flat planes mate.

9. An optical coupler as claimed in claim 6, wherein said optical coupler has a 1×2 circuit.

10. An optical coupler as claimed in claim 6, wherein said optical coupler has a pair of 1×2 circuits.

11. An optical coupler as claimed in claim 6, wherein said thin film transmits light power at a first wavelength ($\lambda_1$) and reflects light power at a second wavelength ($\lambda_2$) when light incident on one of said first and second graded index rod lenses contains light power at both first and second wavelengths ($\lambda^1+\lambda_2$).

12. An optical coupler as claimed in claim 6, wherein said thin film consists of multiple layers of dielectric material formed on the surface of one of said graded index rod lenses.

* * * * *